United States Patent
Cope et al.

(10) Patent No.: US 9,372,823 B1
(45) Date of Patent: Jun. 21, 2016

(54) CONTROLLING AN ACCESS POINT CONNECTION

(75) Inventors: Warren B. Cope, Olathe, KS (US); John E. Belser, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 333 days.

(21) Appl. No.: 13/404,275

(22) Filed: Feb. 24, 2012

(51) Int. Cl.
*G06F 15/16* (2006.01)
*H04W 48/14* (2009.01)

(52) U.S. Cl.
CPC ............... *G06F 15/16* (2013.01); *H04W 48/14* (2013.01)

(58) Field of Classification Search
USPC ........................................................ 709/229
See application file for complete search history.

(56) References Cited

U.S. PATENT DOCUMENTS

| | | | |
|---|---|---|---|
| 2007/0142039 A1* | 6/2007 | Bushnell et al. | 455/414.1 |
| 2010/0077036 A1* | 3/2010 | DeLuca et al. | 709/206 |
| 2010/0087164 A1* | 4/2010 | Ritzau et al. | 455/411 |
| 2011/0065417 A1 | 3/2011 | McDonald et al. | |
| 2011/0130116 A1 | 6/2011 | Yin et al. | |
| 2012/0117221 A1* | 5/2012 | Katpelly et al. | 709/224 |

* cited by examiner

*Primary Examiner* — Angela Nguyen (57) ABSTRACT

In systems and methods of controlling a connection between a wireless device and an access point, it is determined that a first wireless device is not authorized to connect to an access point of a first data network. A message is transferred to a second wireless device by a second data network requesting permission for the first wireless device to connect to the access point. A message can be received from the second wireless device granting the first wireless device permission to connect to the access point.

18 Claims, 7 Drawing Sheets

CONTROLLING AN ACCESS POINT CONNECTION

TECHNICAL BACKGROUND

Wireless devices can access data networks through wired or wireless connections. Such network connections are typically made through an access point, which can be wired, wireless, or a combination thereof. While a wide variety of information is available on data networks, especially the Internet, in some cases a user may wish to restrict access to certain information, or to certain access points. As one example, a parent or guardian may desire to restrict data access of a child to certain information, content, web sites, and the like.

Users can restrict the data access of a wireless device at an access point. For example, a parent can instruct a home access point, such as a WiFi router, to restrict network access of a designated wireless device, such as a child's computer. In this scenario, network access restrictions are imposed at the router, as opposed to, for example, by software on the wireless device, such as so-called parental control software which places restrictions on device-resident browser software. However, if the wireless device were to connect to an access point which did not impose data access restrictions, for example, a WiFi router at a friend's house, the wireless device would have unrestricted access to any data or information from a data network.

Overview

In operation, it is determined that a first wireless device is not authorized to connect to an access point of a first data network. A message is transferred to a second wireless device by a second data network requesting permission for the first wireless device to connect to the access point. A message can be received from the second wireless device granting the first wireless device permission to connect to the access point. In an embodiment, a message can be from the first wireless device at a permissions node of the second data network to determine whether the first wireless device is authorized to connect to the access point, and the determination as to whether the first wireless device is authorized to connect to the access point can be made at the permissions node.

DETAILED DESCRIPTION

In systems and methods of controlling a connection between a wireless device and an access point, it is determined that a first wireless device is not authorized to connect to an access point of a first data network. The determination can be made at a network node and/or at the first wireless device. A message is transferred to a second wireless device by a second data network requesting permission for the first wireless device to connect to the access point. A message can be received from the second wireless device granting the first wireless device permission to connect to the access point. Access permissions of the first wireless device can be stored at a network node and/or at the first wireless device.

Figure 1:
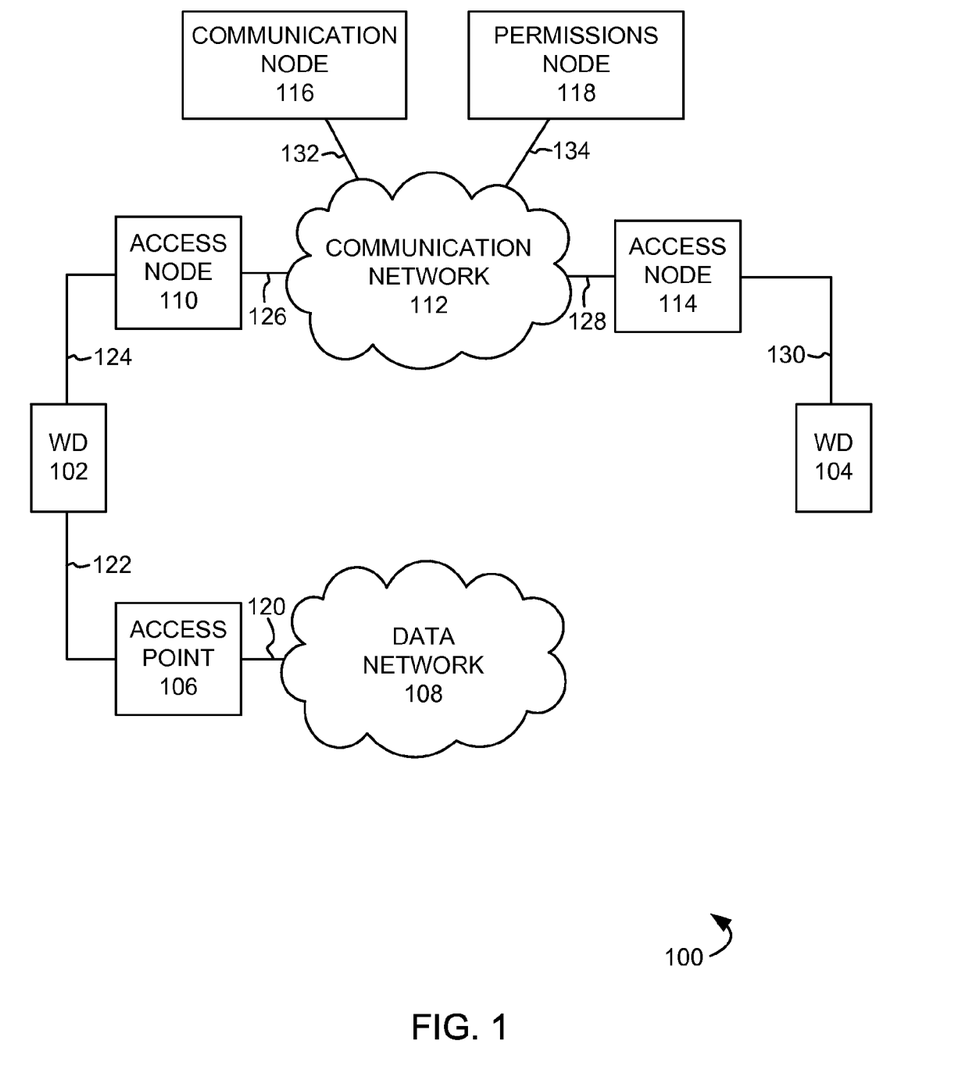
FIG. 1 illustrates an exemplary communication system to control a connection between a wireless device and an access point.

FIG. 1 illustrates an exemplary communication system 100 to control a connection between a wireless device and an access point. Communication system 100 comprises wireless devices 102 and 104, access point 106, data network 108, access nodes 110 and 114, communication network 112, communication node 116, and permissions node 118. Examples of wireless device 102, 104 can include a cell phone, a smart phone, a computing platform such as a laptop, palmtop, or tablet, a personal digital assistant, an internet access device, or other device capable of wireless communication, including combinations thereof.

Wireless device 102 is in communication with access point 106 through communication link 122, and with access node 110 through communication link 124. Wireless device 104 is in communication with access node 114 through communication link 130. Access point 106 can provide communications to wireless device 102. Examples of access point 106 include wireless devices employing wireless fidelity (WiFi), Bluetooth, or similar communication protocols, and wired devices such as a wired router or similar device, including combinations thereof. Access point 106 is in communication with data network 108 through communication link 120, and access point 106 can facilitate communication between wireless device 102 and data network 108.

Access nodes 110, 114 are network nodes capable of providing wireless communications to wireless devices 102, 104, and can be, for example, a base transceiver station or an eNodeB device. Access nodes 110 and 114 are in communication with communication network 112 through communication links 126 and 128, respectively.

Data network 108 and communication network 112 can be wired and/or wireless communication networks, and can comprise processing nodes, routers, gateways, and physical and/or wireless data links for carrying data among various network elements, including combinations thereof, and can include a local area network, a wide area network, and an internetwork (including the Internet). Wired network protocols that may be utilized by data network 108 and communication network 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Data network 108 and communication network 112 may also comprise a wireless network, including base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Communication network 112 is in communication with communication node 116 through communication link 132 and with permissions node 118 through communication link 134. Communication node 116 can control the setup and maintenance of a communication session over communication network 112 by wireless device 102, 104. Communication node 112 can comprise a mobile switching center (MSC), a dispatch call controller (DCC), a mobility management entity (MME), or other similar network node. Permissions node 118 is configured to permit management of network access permissions of a wireless device and can comprise, for example, a dedicated network node, or the functionality of permissions node 118 can be included in another network node such as a home location register (HLR), a home subscriber server (HSS), an authentication, authorization and accounting node (AAA), or the like.

Communication links 120, 122, 124, 126, 128, 130, 132 and 134 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access point 106 and data network 108, and among access nodes 110, 114, communication network 112, communication node 116, and permissions node 118, which are omitted for clarity, including additional processing nodes, routers, gateways, and physical and/or wireless data links for carrying data among the various network elements.

In operation, a determination is made that wireless device 102 is not authorized to connect to access point 106, which can facilitate communication between wireless device 102 and a first network, such as data network 108. A message is transferred through a second network, such as communication network 112, to wireless device 104 to request permission for wireless device 102 to connect to access point 106. Wireless device 104 can response to the permission request by granting permission for wireless device 102 to connect with access point 106.

Figure 2:
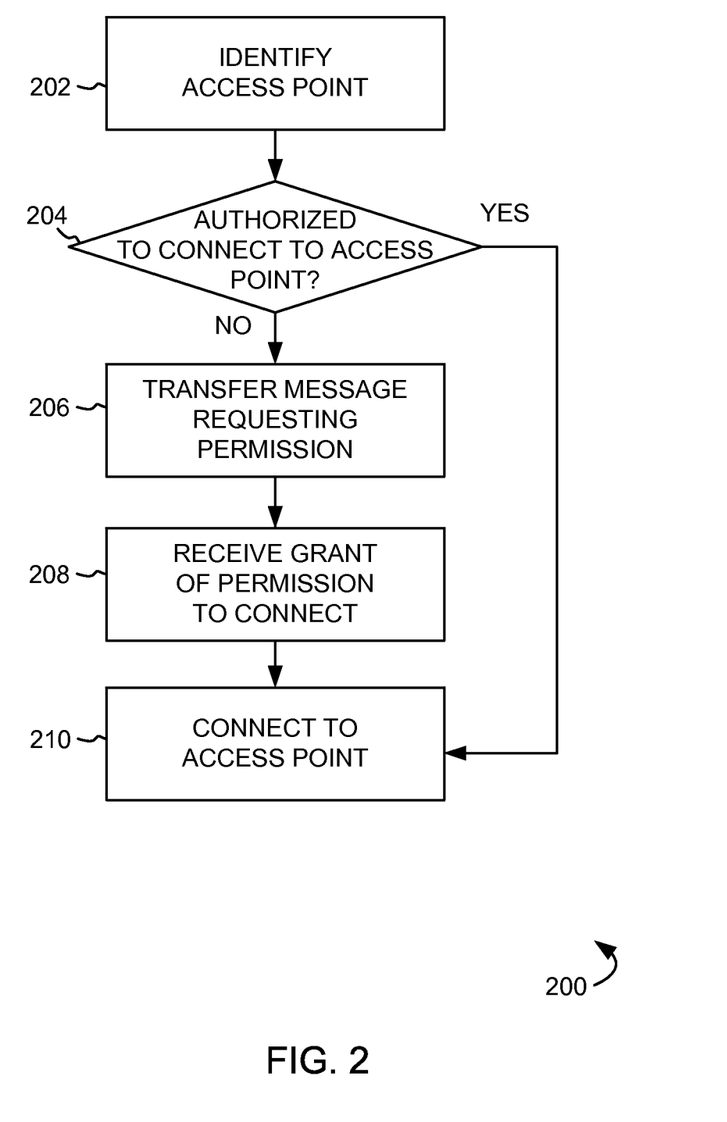
FIG. 2 illustrates an exemplary method of controlling a connection between a wireless device and an access point.

FIG. 2 illustrates an exemplary method 200 of controlling a connection between a wireless device and an access point. In operation 202, a wireless device, such as wireless device 102, identifies an access point, such as access point 106. For example, wireless device 102 can be capable of scanning for access points within a range and identifying a detected access point.

When access point 106 is identified, it is determined whether wireless device 102 is authorized to connect to access point 106 (operation 204). For example, wireless device 102 can send an identification of access point 106 to permissions node 118 via access node 110 and communication network 112, and permissions node 118 can then determine whether wireless device 102 is authorized to connect to access point 106. When wireless device 102 is authorized to connect to access point 106 (operation 204—YES), permissions node 118 sends an indication that wireless device 102 is authorized, and wireless device 102 can connect to access point 106 (operation 210). As another example, wireless device 102 can compare an identification of access point 106 to a list of authorized access points (such as a "white list" or the like) and can determine whether access point 106 is on the list of authorized access points. When wireless device 102 is authorized to connect to access point 106 (operation 204—YES), wireless device 102 can proceed to connect to access point 106 (operation 210), and access point 106 can then facilitate communication between wireless device 102 and data network 108.

When wireless device 102 is not authorized to connect to access point 106 (operation 204—NO), then a message is transferred to wireless device 104 through communication network 112 and access node 114 notifying wireless device 104 that wireless device 102 is seeking to connect to access point 106, and further requesting permission for wireless device 102 to connect to access point 106. Wireless device 104 is associated with the authority to grant or revoke permission for wireless device 102 to connect with access point 106. For example, wireless device 104 may be associated with a parent, and wireless device 102 may be associated with a child, thus allowing the parent to set access controls for the child's wireless device 102. Wireless device 104 can also be associated with a business owner or a manager, can wireless device 102 can be associated with an employee or contractor for whom access to an access point can be granted or revoked by the business owner or manager, for example, to control access to a secure data network. Other examples are also possible. In an embodiment, the message received by wireless device 104 comprises information identifying the access point 106, such as an SSID, a MAC ID, or other identifier, a description of access point 106 (such as a description of a physical location of access point 106), and a date and/or time indication of when wireless device 102 first interacted with access point 106. In an embodiment, the transferred message can originate from wireless device 102, or the transferred message can originate from permissions node 118.

Based on the transferred message, wireless device 104 may provide a response to permissions node 118 granting or denying permission for wireless device 102 to connect with access point 106 (operation 208). When the response denies the requested permission, permissions node 118 can notify wireless device 102, and wireless device 102 will not be permitted to connect with access point 106. When the response grants the requested permission, permissions node 118 can then send a message to wireless device 110 indicating that permission to connect to access point 106 has been granted, and wireless device 106 can then proceed to connect to access point 106 (operation 210).

Figure 3:
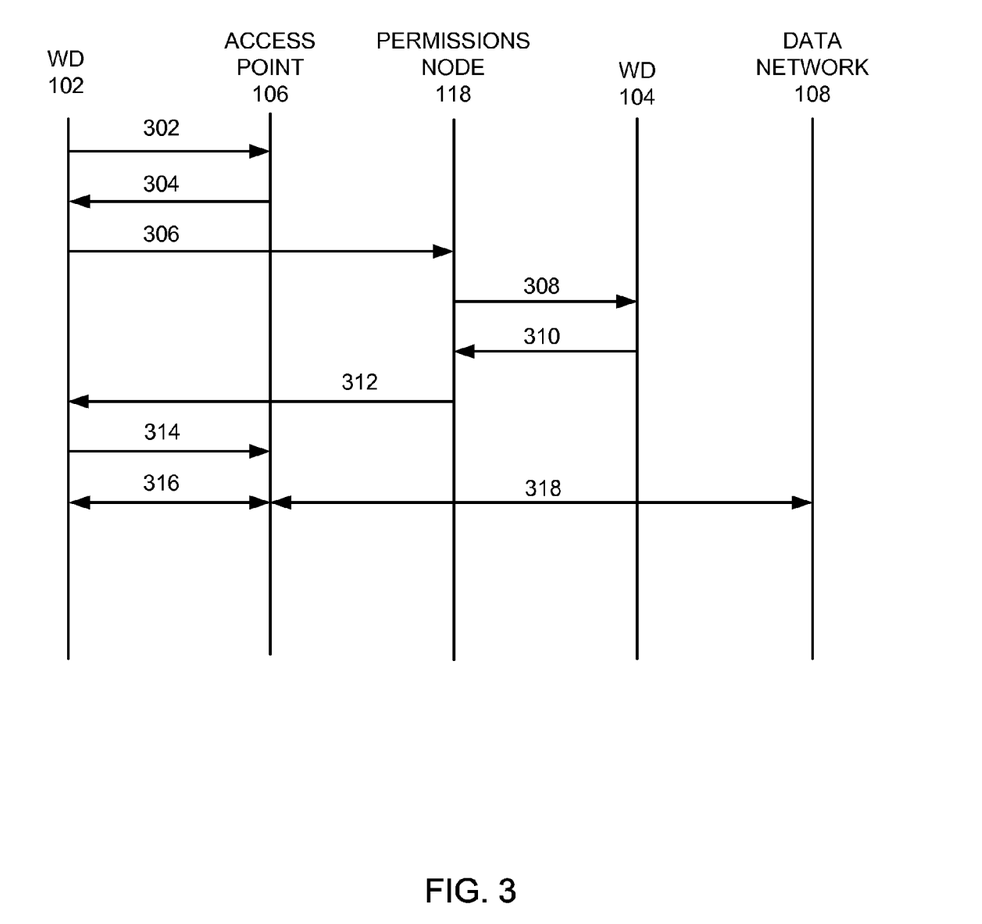
FIG. 3 illustrates a data flow diagram of an exemplary method of controlling a connection between a wireless device and an access point.

FIG. 3 illustrates a data flow diagram of an exemplary method of controlling a connection between a wireless device and an access point. In an embodiment, wireless device 102 sends an identification request 302 to access point 106, and access point 106 responds with identifying information 304. It is then determined whether wireless device 102 is authorized to connect with access point 106 based on the identifying information.

Message 306 can serve a variety of functions. In an embodiment, wireless device 102 can send the identifying information of access point 106 to permissions node 118 (as message 306), and permissions node 118 can then determine whether wireless device 102 is authorized to connect to access point 106. In another embodiment, wireless device 102 can compare the identifying information of access point 106 to a list of authorized access points (such as a "white list" or the like) and can determine whether access point 106 is on the list of authorized access points. When wireless device 102 is not authorized to connect with access point 106, wireless device 102 can send an authorization request (as message 306) to permissions node 118.

Permissions node can send a notification (308) to wireless device 104 that wireless device 102 is seeking to connect to access point 106, and further requesting permission for wireless device 102 to connect to access point 106. Wireless device 104, having the authority to grant or revoke permission for wireless device 102 to connect with access point 106, can send message 310 indicating the granting (or denying) of authorization for wireless device 102 to connect with access point 106. When wireless device 104 grants the authorization, permissions node 118 can send message 312 to wireless device 110 indicating that permission to connect to access point 106 has been granted. Wireless device 106 can send connection request 314 to access point 106 upon receiving the indication that the connection is permitted, whereupon a connection 316 can be established between wireless device 102 and access point 106, and access point 106 can facilitate communication 318 with data network 108.

Figure 4:
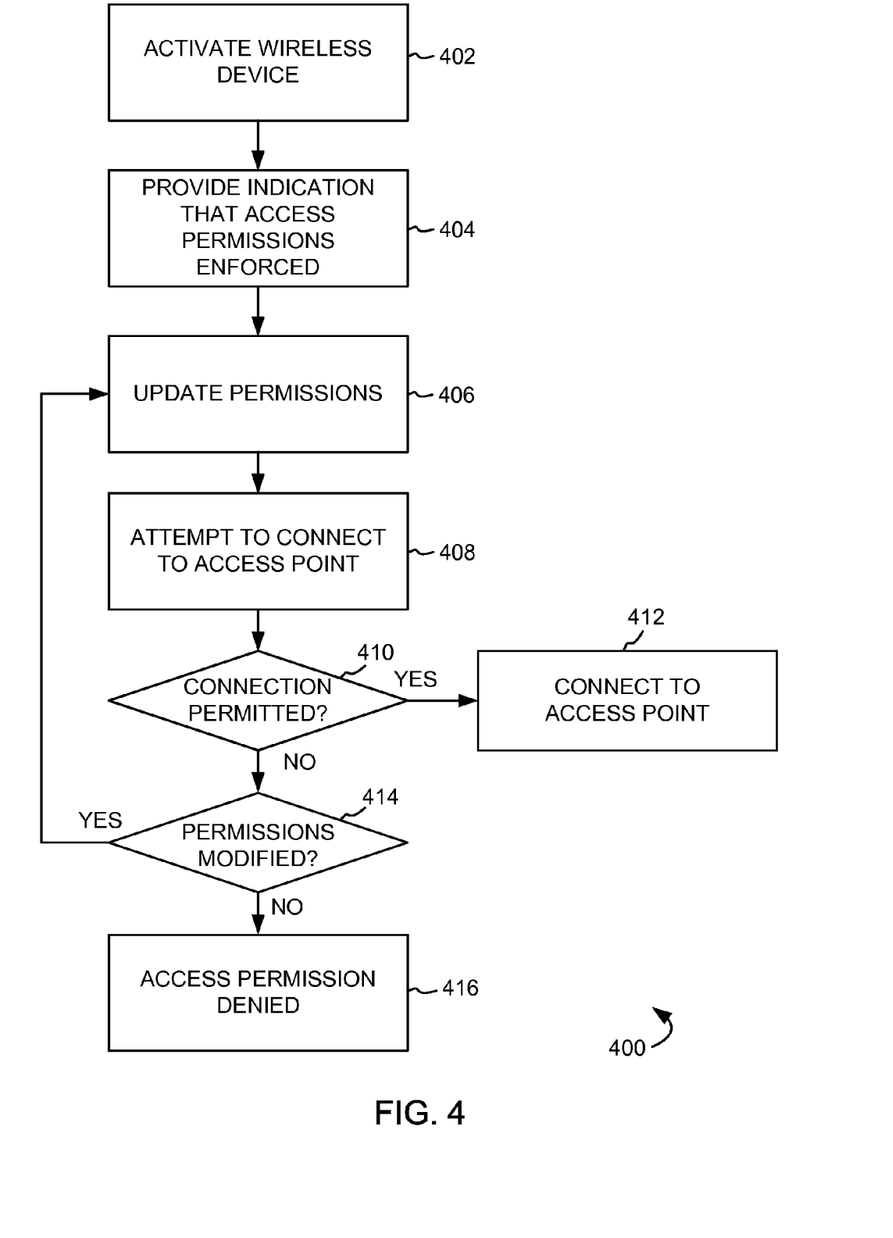
FIG. 4 illustrates another exemplary method of controlling a connection between a wireless device and an access point.

FIG. 4 illustrates another exemplary method 400 of controlling a connection between a wireless device and an access point. In operation 402, wireless device 102 is activated. Operation 402 can comprise, for example, the initial provisioning of wireless device 102 upon purchase and activation, or the powering on of wireless device 102, or the bringing of wireless device 102 out of a "sleep" or "idle" state, or the initialization of software resident on wireless device 102. Other examples are also possible. In operation 404, an indication is provided that access permissions are enforced upon wireless device 102. For example, an indication can be set on wireless device 102, such as a flag in memory or other such indication, that wireless device 102 is subject to access controls. As another example, an indication that wireless device 102 is subject to access controls can be set in a network node, such as permissions node 118.

Following activation of wireless device 102, the permitted access controls of wireless device 102 are periodically checked to determine if any changes have been made, for example, by wireless device 104, and if changes have been made, then relevant indications of the access permissions of wireless device 102 can be updated (operation 406). For example, wireless device 102 may include a permissions list or similar indications of access points to which it is authorized to connect, which can be updated if any modifications have been made to the permissions. Similarly, indications of authorized access points may be periodically checked and updated in permissions node 118.

In operation 408, wireless device 102 attempts to connect to access point 106. Because there is an indication that access permissions are enforced on wireless device 102, it is determined whether wireless device 102 is authorized to connect with access point 106 (operation 410). When the connection is permitted (operation 410-YES), then wireless device 102 can proceed to connect with access point 106 (operation 412).

When the connection is not permitted (operation 410—NO), then it can be determined as to whether the access permissions of wireless device 102 have been modified (operation 414). For example, a request for permission to connect with access point 106 can be sent to wireless device 104, and wireless device 104 may respond with a message granting permission for wireless device 102 to connect with access point 106. When wireless device 104 does not grant permission for wireless device 102 to connect with access point 106 or otherwise modify the access permissions of wireless device 102 (operation 414—NO), then access permission is denied to wireless device 102, and an indication that wireless device 102 is not permitted to connect with access point 106 can be provided to wireless device 102.

When wireless device 104 does grant permission for wireless device 102 to connect with access point 106 (operation 414—YES), then the permission indications for wireless device 102 can be updated (operation 406). The access permissions for wireless device can be updated on wireless device 102, or at permissions node 118. The authorization for wireless device 102 to connect with access point 106 can be limited or unlimited. Possible limitations on the grant of access permission include a limitation on access to a particular date or time period, or to a certain data rate, or to a certain total amount of data transferred to or from wireless device 102. Limitations can also be imposed based on an application running on wireless device 102, or a type of data transferred to or from wireless device 102, such as a type of data flow, or a quality of service (QoS) designation. Other limitations, as well as combinations of the foregoing, are also possible.

When the access permissions of wireless device 102 are updated to permit wireless device 102 to connect with access point 106, then when wireless device 102 attempts to connect with access point 106 (operation 408), the connection will be permitted (operation 410—YES) and wireless device can then proceed to connect with access point 106 (operation 412).

Figure 5:
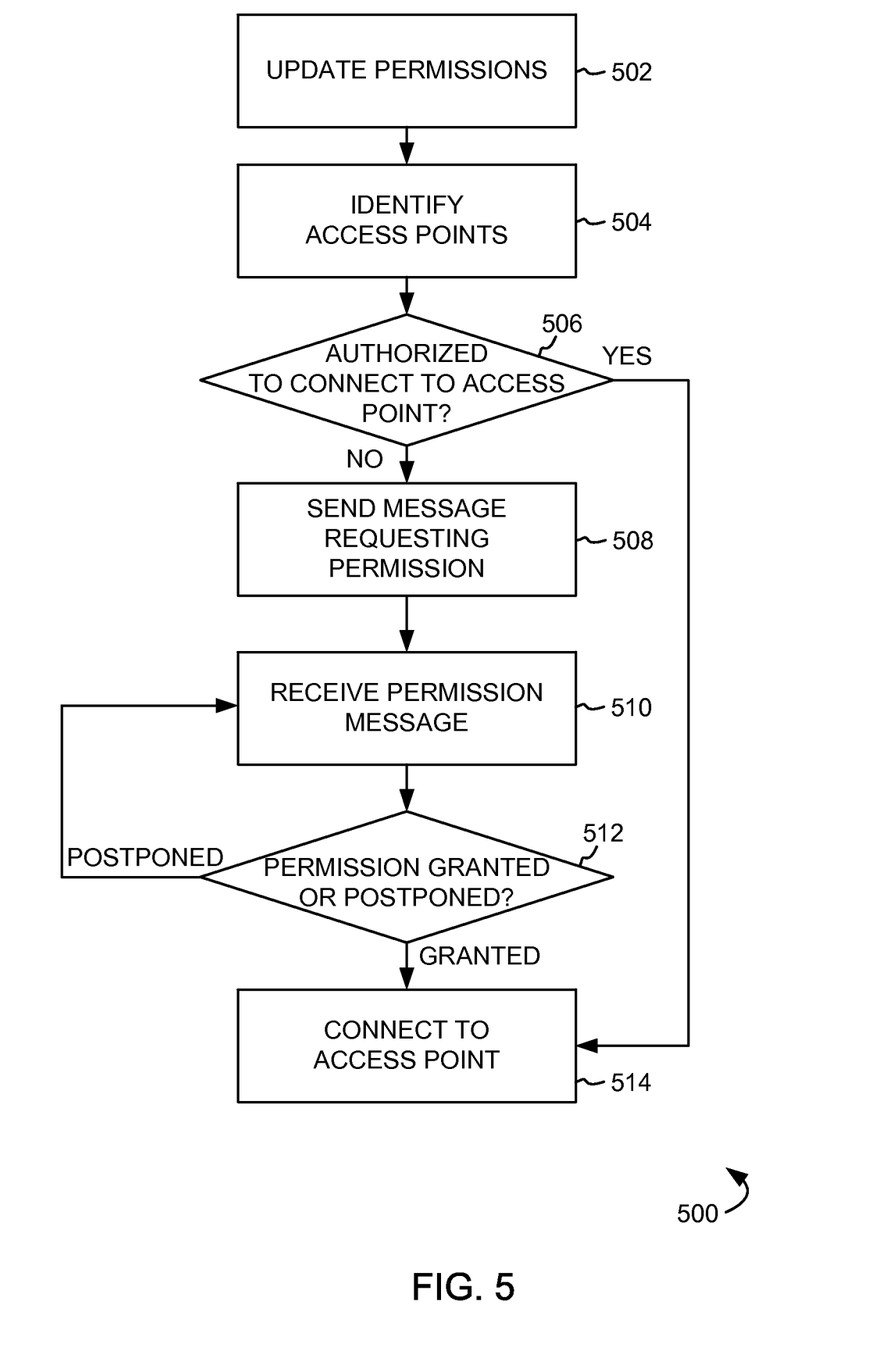
FIG. 5 illustrates another exemplary method of controlling a connection between a wireless device and an access point.

FIG. 5 illustrates another exemplary method 500 of controlling a connection between a wireless device and an access point. In operation 502, access permissions of wireless device 102 are updated. For example, wireless device 104 can periodically change the access permissions of wireless device 102, and the updated permissions can be provided to and stored at permissions node 118 and/or wireless device 102.

In operation 504, wireless device 102 detects and identifies access points, such as access point 106, and a determination is made as to whether wireless device 102 is authorized to connect to access point 106 (operation 506). The determination can be made at permissions node 118 based on an identification of access point 106, or the determination can be made at wireless device 102 and can be provided to permissions node 118. When wireless device 102 is permitted to connect with access point 106 (operation 506—YES), then wireless device 102 proceeds to establish a connection with access point 106 (operation 514).

When wireless device 102 is not permitted to connect with access point 106 (operation 506—NO), a message is sent to wireless device 104 requesting permission for wireless device 102 to connect with access point 106 (operation 508). When the permission request message is received by wireless device 104 (operation 510), wireless device 104 can provide an indication as to whether permission is granted or postponed. (Wireless device 104 can also deny permission to wireless device 102 to connect with access point 106, although this is not illustrated in FIG. 5 for brevity.) When wireless device 104 grants permission for wireless device 102 to connect with access point 106 (operation 512—GRANTED), a message is sent to permissions node 118 indicating the grant of permission. As described above, the grant of permission can be unlimited, or various parameters of the granted permission can be limited. When permission is granted by wireless device 104, wireless device 102 can proceed to establish a connection with access point 106 (operation 514).

When wireless device 104 postpones the granting of permission (operation 512—POSTPONED), wireless device 102 may not proceed to connect with access point 106. Wireless device 104 may be reminded about the pending permission request at a later time. For example, a reminder message can be sent by, for example, permissions node 118, when wireless device 104 has not responded within a predetermined period of time of the receipt of the permission request. Additionally or alternatively, wireless device 104 may present a reminder when a response has not been input to wireless device 104 within a predetermined period of time from the receipt of the permission request. Additionally or alternatively, when wireless device 104 does not respond within a predetermined period of time, a default behavior can be provided, such as to automatically deny or grant access permission to wireless device 102 when wireless device 104 fails to respond within a predetermined period of time. Other reminder and default embodiments are also possible. The ability of wireless device 104 to postpone the granting or denying of permission to wireless device 102 can allow wireless device 104 additional time to decide whether to grant or deny the requested permission. For example, a user of wireless device 104 may contact a user of wireless device 102 to learn more about the requested permission, such as where wireless device 102 is located, the nature of the permission request, what information is desired by wireless device 102 from data network 108, and the like. Wireless device 104 can later grant or deny permission for wireless device 102 to connect with access point 106.

Figure 6:
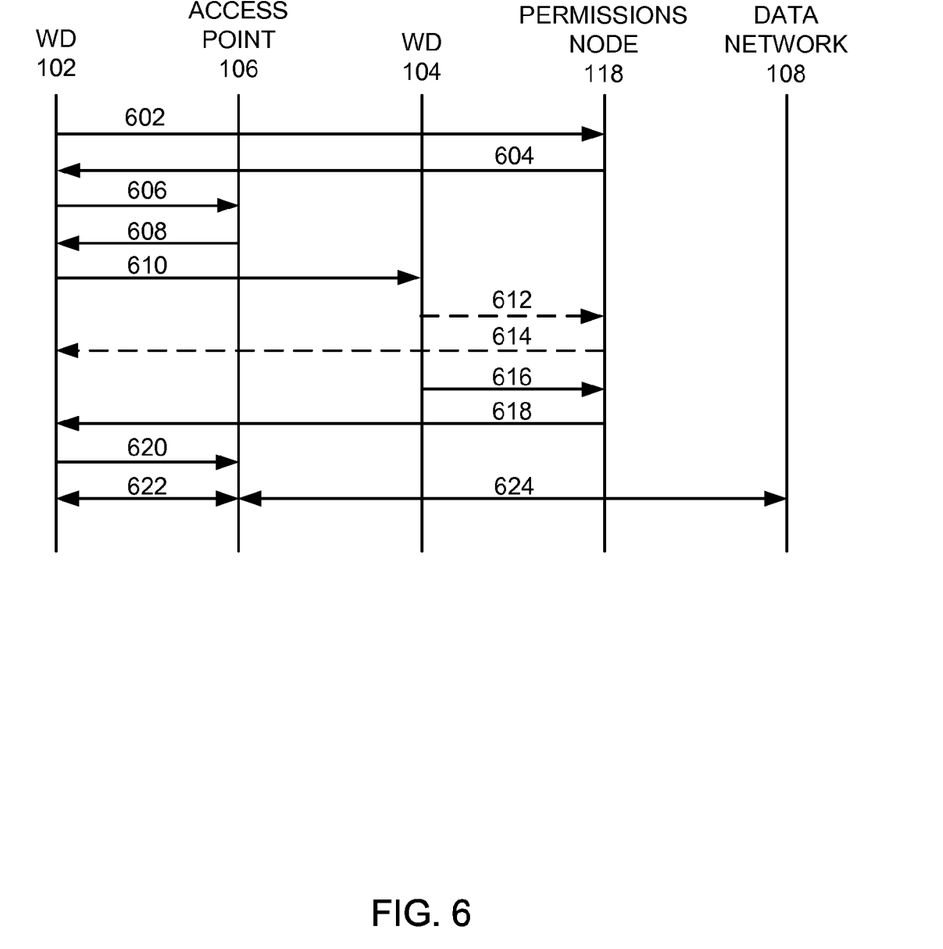
FIG. 6 illustrates another data flow diagram of an exemplary method of controlling a connection between a wireless device and an access point.

FIG. 6 illustrates another data flow diagram of an exemplary method of controlling a connection between a wireless device and an access point. Wireless device 102 can request updated permissions (602) from permissions node 118, which can be provided (604) by permissions node 118 to wireless device 102 and stored on wireless device 102, as well as on permissions node 118. Wireless device 102 can detect access points such as access point 106 and send an identification request 606 to access point 106, which responds with identifying information 608. In an embodiment, based on the identifying information from access point 106, wireless device 102 can determine that wireless device 102 does not have permission to connect with access point 106. In an embodiment, permissions node 118 can make the determination and can notify wireless device 102 that wireless device 102 does not have permission to connect with access point 106.

Wireless device 102 can send a permission request (610) to wireless device 104. As described above, permission request (610) can also be sent from wireless device 102 to permissions node 118, and permissions node 118 can send a permission request to wireless device 104. Wireless device 104 may postpone the granting or denying of permission to wireless device 102, and wireless device can provide a postponement indication (612) to permissions node 118. Permissions node 118 can send a message (614) to wireless device 102 indicating that permission is not granted, or that the decision has been postponed, or some variation or combination thereof.

Wireless device 104 can later grant or deny permission for wireless device 102 to connect with access point 106 (616). When wireless device 104 grants the requested permission to wireless device 102, message (616) indicates to permissions node 118 that the requested permission is granted, and the permissions node 118 provides an indication (618) to wireless device 102 that permission is granted to connect with access point 106.

Wireless device 102 can then connection request (620) to access point 106 upon receiving the indication that the connection is permitted, whereupon a connection (622) can be established between wireless device 102 and access point 106, and access point 106 can facilitate communication (624) with data network 108.

Figure 7:
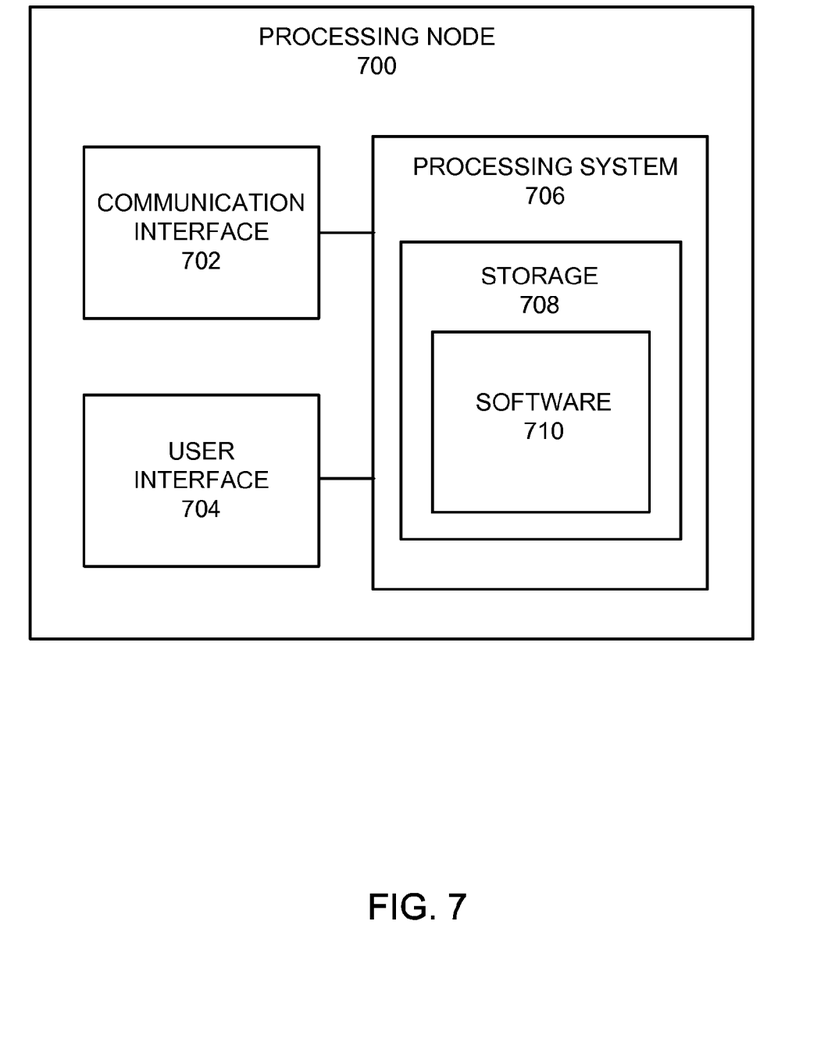
FIG. 7 illustrates an exemplary processing node.

FIG. 7 illustrates an exemplary processing node 700 comprising communication interface 702, user interface 704, and processing system 706 in communication with communication interface 702 and user interface 704. One example of processing node 700 is permissions node 118 illustrated in FIG. 1 and described above. Communication interface 702 enables processing node 700 to communicate with other network elements. User interface 704 permits processing node 700 to provide information and to receive inputs to configure and control the operation of the processing node 700.

Processing system 706 further comprises storage 708 and software 710, and may include a processor and other circuitry to retrieve and execute software 710 from storage 708. Storage 708 comprises a disk drive, flash drive, memory circuitry, or other memory device. Storage 708 can store software 710 which is used in the operation of the processing node 700. Software 710 may include an operating system, utilities, drivers, network interfaces, applications, or some other type of machine-readable instructions.

Some or all of the actions performed by the exemplary embodiments described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of controlling a connection between a wireless device and an access point, comprising:
    determining, by a permission node, that a first wireless device is not authorized to connect to an access point of a first data network, wherein the permission node part of a cellular network different from the first data network;
    transferring a message from the permission node to a second wireless device over the cellular network requesting permission for the first wireless device to connect to the access point; and
    receiving a message from the second wireless device over the cellular network granting the first wireless device permission to connect to the access point, wherein the access point is added to a list of permitted access points associated with the first wireless device.

2. The method of claim 1, wherein determining further comprises receiving a message from the first wireless device at a permissions node of the cellular network to determine whether the first wireless device is authorized to connect to the access point.

3. The method of claim 1, wherein receiving a message further comprises receiving a message from the second wireless device at the permissions node to grant the first wireless device permission to connect to the access point.

4. The method of claim 1, wherein receiving a message further comprises receiving a message from the second wireless device at the permissions node to grant the first wireless device permission to connect to the access point.

5. The method of claim 1, wherein receiving a message further comprises receiving a message from the second wireless device at the first wireless device to grant the first wireless device permission to connect to the access point.

6. The method of claim 1, wherein receiving a message further comprises receiving a first message from the second wireless device postponing permission to connect to the access point and receiving a second message from the second wireless device at a later time granting the first wireless device permission to connect to the access point.

7. The method of claim 1, wherein receiving a message further comprises receiving a message from the second wireless device at the first wireless device to grant the first wireless device limited permission to connect to the access point such that the permission is limited by one of a time period, a total amount of data transferred to the first wireless device, and an application running on the first wireless device.

8. The method of claim 1, wherein the first data network comprises a wireless local area network and the permission node connected to the cellular network stores permissions for the access point connected to the wireless local area network.

9. The method of claim 3, wherein the permissions node sends a message to the first wireless device indicating that the first wireless device has permission to connect to the access point based on the message from the second wireless device.

10. A processing node of a communication system for controlling a connection between a wireless device and an access point, configured to:
    determine that a first wireless device is not authorized to connect to an access point of a first data network, wherein the processing node is part of a cellular network different from the first data network;
    transfer a message to a second wireless device over the cellular network requesting permission for the first wireless device to connect to the access point;
    receive message from the second wireless device over the cellular network granting the first wireless device permission to connect to the access point; and
    send a message to the first wireless device to add the access point to a list of permitted access points.

11. The processing node of claim 10, further configured to determine that the first wireless device is not authorized to connect to an access point of the first data network based on a message from the first wireless device over the cellular network.

12. The processing node of claim 10, further configured to transfer the message requesting permission from the first wireless device to the second wireless device.

13. The processing node of claim 10, further configured to transfer the message requesting permission for the first wireless device to connect to the access point from the processing node to the second wireless device.

14. The processing node of claim 10, further configured to:
    receive a message from the second wireless device to grant the first wireless device permission to connect to the access point; and
    send a message to the first wireless device indicating that the first wireless device has permission to connect to the access point based on the message from the second wireless device.

15. The processing node of claim 10, further configured to add the access point to a list of permitted access points associated with the first wireless device based on the message received from the second wireless device.

16. The processing node of claim 10, further configured to receive a first message from the second wireless device postponing permission to connect to the access point and receiving a second message from the second wireless device at a later time granting the first wireless device permission to connect to the access point.

17. The processing node of claim 10, wherein receiving a message further comprises receiving a message from the second wireless device at the first wireless device to grant the first wireless device limited permission to connect to the access point such that the permission is limited by one of a time period, a total amount of data transferred to the first wireless device, and an application running on the first wireless device.

18. The processing node of claim 10, wherein the first data network comprises a wireless local area network and the processing node connected to the cellular network stores permissions for the access point connected to the wireless local area network.

* * * * *